United States Patent [19]
Aksay et al.

[11] Patent Number: 6,004,444
[45] Date of Patent: Dec. 21, 1999

[54] BIOMIMETIC PATHWAYS FOR ASSEMBLING INORGANIC THIN FILMS AND ORIENTED MESOSCOPIC SILICATE PATTERNS THROUGH GUIDED GROWTH

[75] Inventors: Ilhan A. Aksay, Princeton, N.J.; Mathias Trau, Balmosal, Australia; Srinivas Manne, Tucson, Ariz.; Itaru Honma, Chiba, Japan; George Whitesides, Newton, Mass.

[73] Assignee: The Trustees of Princeton University, Princeton, N.J.

[21] Appl. No.: 08/964,876

[22] Filed: Nov. 5, 1997

[51] Int. Cl.$^6$ .................................................. B01D 57/02
[52] U.S. Cl. .............................................................. 204/515
[58] Field of Search ............................................. 204/515

[56] References Cited

PUBLICATIONS

Aksay et al., Biomimetic Pathways for Assembling Inorganic Thin Films, Science, vol. 273, Aug. 16, 1996, pp. 892–898.

Bunker, et al. Ceramic Thin–Film Formation on Functionalized Interfaces Through Biomimetic Processing, Science, vol. 264, Apr. 1, 1994, pp. 48–55.

Collins, et al., Low temperature deposition of patterned $TiO_2$ thin films using photopatterned self–assembled monolayers, Appl. Phys. Lett. 69(6), Aug. 5, 1996, pp. 860–862.

DeGuire, et al., Deposition of oxide thin films on silicon using organic self–assembled monolayers, SPIE vol. 2686, pp. 88–99.

Kim, et al., Polymer microstructures formed by moulding in capillaries, Nature vol. 376, Aug. 17, 1995, pp. 581–584.

Kumar, et al, Features of gold having micrometer to centimeter dimensions can be formed through a combination of stamping with an elastomeric stamp and an alkanethiol "ink" followed by chemical etching, Appl. Phys. Lett. 63(14) Oct. 4, 1993, pp. 2002–2004.

Kumar, et al., Patterning Self–Assembled Monolayers: Applications in Materials Science, Langmuir 1994, pp. 1498–1511 no month.

Stephen Mann, Molecular recognition in biomineralization, Nature, vol. 332, Mar. 10, 1988, pp. 119–124.

Manne, et al., Direct Visualization of Surfactant Hemimicelles by Force Microscopy of the Electrical Double Layer, Langmuir 1994, pp. 4409–4413 no month.

Manne, et al., Molecular Organization of Surfactants at Solid–Liquid Interfaces, Science, vol. 270, Dec. 1, 1995, pp. 1480–1482.

Rieke, et al., Spatially Resolved Mineral Deposition on Patterned Self–Assembled Monolayers, Langmuir, 1994, pp. 619–622 no month.

Tarasevich, et al., Nucleation and Growth of Oriented Ceramic Films onto Organic Interfaces, Chem. Mater., 1996, 8, pp. 292–300 no month.

*Primary Examiner*—Arun S. Phasge
*Attorney, Agent, or Firm*—Friscia & Nussbaum

[57] ABSTRACT

A process directed to preparing surfactant-polycrystalline inorganic nanostructured materials having designed microscopic patterns. The process includes forming a polycrystalline inorganic substrate having a flat surface and placing in contact with the flat surface of the substrate a surface having a predetermined microscopic pattern. An acidified aqueous reacting solution is then placed in contact with an edge of the surface having the predetermined microscopic pattern. The solution wicks into the microscopic pattern by capillary action. The reacting solution has an effective amount of a silica source and an effective amount of a surfactant to produce a mesoscopic silica film upon contact of the reacting solution with the flat surface of the polycrystalline inorganic substrate and absorption of the surfactant into the surface. Subsequently an electric field is applied tangentially directed to the surface within the microscopic pattern. The electric field is sufficient to cause electroosmotic fluid motion and enhanced rates of fossilization by localized Joule heating.

11 Claims, 11 Drawing Sheets

BIOMIMETIC PATHWAYS FOR ASSEMBLING INORGANIC THIN FILMS AND ORIENTED MESOSCOPIC SILICATE PATTERNS THROUGH GUIDED GROWTH

GOVERNMENT RIGHTS

The present invention has been made under a contract by the United States Army Research Office and the MRSEC program of the NSF and the government may have certain rights to the subject invention.

BACKGROUND OF THE INVENTION

1. Field of the Invention

This invention generally relates to a process for preparing surfactant-polycrystalline inorganic nanostructured materials having designed microscopic patterns using a polycrystalline inorganic substrate. More specifically, this invention relates to biomimetically assembling inorganic thin films, and to the synthesis of mesostructured film using a supramolecular assembly of surfactant molecules at interfaces to template the condensation of an inorganic silica lattice. Additionally, this invention relates to forming an ordered silicate structure within a highly confined space.

2. Related Art

Biologically produced inorganic-organic composites such as bone, teeth, diatoms, and sea shells are fabricated through highly coupled (and often concurrent) synthesis and assembly. These structures are formed through template-assisted self-assembly, in which self-assembled organic material (such as proteins, or lipids, or both) form the structural scaffolding for the deposition of inorganic material. They are hierarchically structured composites in which soft organic materials are organized on length scales of 1 to 100 nm and used as frameworks for specifically oriented and shaped inorganic crystals (that is, ceramics such as hydroxyapatite, $CaCo_3$, $SiO_2$, and $Fe_3O_4$). In some cases, structurally organized organic surfaces catalytically or epitaxially induce growth of specifically oriented inorganic thin films.

Most importantly, however, nature's way of mineralization uses environmentally balanced aqueous solution chemistries at temperatures below 100° C. This approach provides an attractive alternative to the processing of inorganic thin films, especially in applications where substrates cannot be exposed to high temperatures, or more generally in the pursuit of increased energy efficiency.

Potential applications for dense, polycrystalline inorganic films span a broad range of industries. These include the possibility of applying hard optical coatings to plastics in order to replace glass, abrasion-resistant coatings for plastic and metal components subject to wear, and the deposition of oriented films of iron oxide phases for use as magnetic storage media. For many of these applications, conventional ceramic processing methods, which require high temperature sintering, cannot be used because of problems with substrate degradation.

A classic and a widely studied example of a biocomposite is the nacre of abalone shell, in which thin films of organic (<10 nm) and inorganic (<0.5 μm) phases are coupled together to produce a laminated structure with improved mechanical properties. Scanning electron microscopy (SEM) and transmission electron microscopy (TEM) images of this material are shown in FIG. 1 of this application. Because of this special architecture, composites such as nacre are simultaneously hard, strong, and tough. The core of the organic template is composed of a layer of β-chitin layered between "silk-like" glycine-and alanine-rich proteins. The outer surfaces of the template are coated with hydrophilic acidic macromolecules rich in aspartic and glutamic acids. Recent studies suggest that these acidic macromolecules alone are responsible for control of the polymorphic form and the morphology of the $CaCO_3$ (calcite versus aragonite) crystals, although the role of the β-chitin supported matrix on the lamellar morphology of the $CaCO_3$ layers over macroscopic dimensions still remains to be determined.

Morphological and crystallographic analyses of the aragonitic thin layers of nacre by electron microdiffraction show that c-axis-oriented aragonite platelets form a hierarchical tiling of a twin-related dense film with twin domains extending over three length scales. Superposition of the aragonite lattices on all three possible sets of twins generates a new superlattice structure, which suggests that the organic template adopts a single-crystalline psuedohexagonal structure. Although cellular activities leading to the self-assembly or the organic template remain to be understood, the presence of organized organic template is essential to the assembly of the inorganic layer.

In recent years, a number of researchers have demonstrated the viability of this approach for the preferential growth of inorganic crystals at the solid/liquid and liquid/air interfaces. Furthermore, through chemical modification of these interfaces, by adsorbing surfactants or other reactive moieties, the crystal phase, morphology, growth habit, and even chirality of heterogeneously deposited inorganics can be controlled.

Mann et al., Nature 332, 119 (1988), describes phase-specific, oriented calcite crystals grown underneath a compressed surfactant monolayer at the air/water interface. Changing surfactant type or degree of monolayer compression results in different crystal phases and orientations.

Pacific Northwest National Laboratories (PNNL), B. C. Bunker et al., Science 264, 48 (1994), describes chemically modifying solid metal, plastic, and oxide surfaces, and the selection of phase and orientation of the depositing crystalline inorganic at a variety of solid/liquid interfaces. Bunker et al. describes the use of a self-assembled monolayer (SAM) approach to coat metal and oxide substrates with surfactant monolayers of tailored hydrophilicity. This is accomplished by pretreating the substrates with a solution of functionalized surfactants, such as sulfonic acid-terminated octadecyl tricholorsilane, before precipitation of the inorganic phase. The choice of the terminating moiety on the surfactant tail determines surface charge and relative hydrophobicity of the chemisorbed surfactant monolayer. In this way, oxide and metal substrates can be modified to have the required surface properties to promote inorganic film growth.

A. Kumar and G. M. Whitesides, Appl. Phys. Lett. 63, 2002 (1993); and A. Kumar, H. A. Biebuyck, G. M. Whitesides, Langmuir 10, 1498 (1994), describe a microcontact printing method by which complex, designed SAM patterns may be transferred onto substrates with an elastomeric stamp. This approach sets up lateral variations in the $\gamma_{is}-\gamma_{sl}$ value along the substrate and may be used to selectively nucleate and grow inorganic phase on the functionalized regions.

B. J. Tarasevich, P. C. Rieke, J. Lin, Chem. Mater. 8, 292 (1996); and P. C. Rieke et al., Langmuir 10,619 (1994), describe the spatially resolved deposition of FeOOH mineral through an analogous SAM approach by using electron and ion beam lithography to pattern the SAM layer. This technique allows micrometer-scaled patterning of inorganic materials on a variety of substrates through confined nucleation and growth of inorganic films.

M. R. De Guire et al., *SPIE Proc.*, in press; and R. J. Collins, H. Shin, M. R. De Guire, C. N. Sukenik, A. H. Heuer (unpublished) describe the use of photolithography to pattern the SAM layer prior to area-selective mineralization of $TiO_2$, $ZrO_2$, $SiO_2$, or $Y_2O_3$ films.

Kim et al., *Nature* 376,581 (1995) describes an alternative to the SAM approach of micromolding in capillaries (MIMIC). In this process, submicrometer-scale patterning of inorganic films is achieved by placing an elastomeric stamp, containing relief features on its surface, into contact with a substrate. Contact between the elastomeric stamp and the substrate forms a network of interconnected channels that may be filled with an inorganic precursor fluid [such as poly(ethoxynethylsiloxane)] through capillary action. After the material in the fluid is cross-linked, crystallized, or deposited onto the substrate, the elastomeric stamp is removed to leave behind a patterned inorganic film with micro-structures complementary to those present in the mold.

S. Manne et al. *Langmiur* 10, 4409 (1994) and H. Gaub, *Science* 270, 1480 (1995), have shown that three-dimensional surfactant structures such as cylindrical tubules and spheres can be formed at solid/liquid interfaces. Adsorbed hemi-micellar arrangements were observed on poorly orienting amorphous substrates, such as silica, and aligned tubular structures were observed on more strongly orienting crystalline substrates such as mica and graphite. The latter substrates orient adsorbed surfactants through anisotropic attraction (either van der Waals or electrostatic) between the crystalline substrate and the surfactant molecule. The amorphous silica substrate has no preferential orientation for surfactant adsorption.

Aksay et al., *Science* 273, 892 (1996) describes a method for the formation of continuous mesoscopic silicate films at the interface between liquids and various substrates. The technique used the supramolecular assembly of surfactant molecules at interfaces to template the condensation of an inorganic silica lattice. In this manner, continuous mesostructured silica films can be grown on many substrates, with the corresponding porous nanostructure determined by the specifics of the substrate surfactant interaction. XRD analysis revealed epitaxial alignment of the adsorbed surfactant layer with crystalline mica and graphite substrates, and significant strain in the mesophases silica overlayer. As the films grew thicker, accumulated strain was released resulting in the growth of hierarchical structures from the ordered film. This method was used to form "nanotubules" with dimensions of ~3 nm. Polymerization of the inorganic matrix around these tubules leads to a hexagonally packed array of surfactant channels.

The aforedescribed techniques represent advances in the selective nucleation growth of inorganic crystals with specific phase, orientation, and micropatterns. A significant advantage of the biomimetic processing methods described above is the relatively low processing temperatures involved (typically <100° C.) and the use of water rather than organic solvents. Both of these factors render such methods relatively environmentally benign. Although continuous films of these silicate materials can be formed, the orientation of the tubules depends primarily on the nature of the substrate-surfactant interaction and is difficult to control. Once films grow away from the ordering influence of the interface, chaotic, hierarchical structures arise. Additionally, there is no facility for organic material to adsorb onto or to become incorporated within the growing inorganic structure or to do both.

There is thus a need for the development of low-cost lithographic techniques having the ability to pattern "designed" structural features on the nanometer size scale. Such techniques are important in the manufacture of electronic, opto-electronic and magnetic devices with nanometer scaled dimensions. Technologies involving scanning electron beam, x-ray lithography and scanning proximal probe are currently under development, but the practicality of these techniques remains uncertain. Although these continuous films hold much promise for a multitude of technological applications (e.g., oriented nanowires, sensor/actuator arrays, and optoelectronic devices), a method of orienting the nanotubules into designed arrangements is clearly required for this approach to become viable as a nanolithographic tool. What is desired and has not yet been developed is a method that allows the direction of growth of these tubules to be guided to form highly aligned, designed nanostructures. It would be desirable that the method is independent of the substrate-surfactant interaction and thus allows oriented structures to be formed on any (non-conducting) substrate.

OBJECTS AND SUMMARY OF THE INVENTION

It is an object of this invention to provide a practical, low-cost lithographic process that has the ability to pattern "designed" structural features on the nanometer size scale.

It is an additional object of this invention to provide a process that is useful in the manufacture of electronic, opto-electronic and magnetic devices with nanometer scaled dimensions.

It is a further object of this invention to provide a nanolithographic process that orients the nanotubules into designed arrangements.

It is still another object of this invention to provide a nanolithographic process that allows the direction of growth of these tubules to be guided to form highly aligned, designed nanostructures.

It is still another object of this invention to provide a nanolithographic process that is independent of the substrate-surfactant interaction and thus allows oriented structures to be formed on any (non-conducting) substrate.

All of the foregoing objects are achieved by the process of this invention. The process is directed to preparing surfactant-polycrystalline inorganic nanostructured materials having designed microscopic patterns. The process comprises:

a) forming a polycrystalline inorganic substrate having a flat surface;

b) placing in contact with the flat surface of the substrate a surface having a predetermined microscopic pattern;

c) placing in contact with an edge of the surface having the predetermined microscopic pattern, an acidified aqueous reacting solution, the solution wicking into the microscopic pattern by capillary action, wherein the reacting solution comprises an effective amount of a silica source and an effective amount of a surfactant to produce a mesoscopic silica film upon contact of the reacting solution with the flat surface of the polycrystalline inorganic substrate and absorption of the surfactant into the surface; and d) applying an electric field tangentially directed to the surface within the microscopic pattern, the electric field being sufficient to cause electro-osmotic fluid motion and enhanced rates of fossilization by localized Joule heating.

BRIEF DESCRIPTION OF THE DRAWINGS

Other important objects and features of the invention will be apparent from the following Detailed Description of the Invention taken in connection with that accompanying drawings in which:

FIGS. 1–7 are taken from Aksay et al., Science 273, 892 (1996) which describes the production of mesoscopic films without the required electric field of this invention. These figures are incorporated in this application for background and comparison.

FIG. 7 shows a grazing angle of incidence XRD data for mesostructure silica film growing at the mica/aqueous solution phase interface (after 15 hours of reaction time) showing radial scans of two Bragg peaks, the (002) (filled circles) and the (101) (open squares, expanded by a factor of 1350). Growth of the surfactant film on a freshly cleaved mica substrate results in a highly aligned crystalline lattice, in which the (002) Bragg peak is oriented along the substrate surface normal, with a mosaic width that is less than 0.06°. Furthermore, the (101) Bragg peak is also azimuthally aligned within the surface plane, such that the tubules are oriented along the next-nearest-neighbor direction of the surface oxygen lattice, and having an in-plane mosaic width of ~10°. Both of these observations clearly suggest that the substrate has a strong orienting effect on the co-assembled film. Further evidence of the interaction between the substrate and the co-assembled film can be found in the exact Bragg peak positions. Although bulk mesoscopic silica exhibits a hexagonal lattice, in which case $Q_{002}=Q_{101}$, for films grown on mica the radial peak position of the (002) and (101) Bragg peaks are not equal ($Q_{002}=0.139$ Å$^{-1}$ and $Q_{101}=0.143$ Å$^{-1}$), which implies that the film is strained. From these data, we derive nearest-neighbor spacings of 52 and 50 Å. This strain results in a ratio of lattice spacings of $b/a=(b/\sqrt{3}a)-1=3.7\%$, and an area per tube in the composite film of 2288 Å$^2$ (the inset defines the parameters a and b, and the lines show the model fit). Strain in these films results from epitaxial mismatch between the first adsorbed surfactant layer and the periodic atomic lattice of the substrate.

DETAILED DESCRIPTION OF THE INVENTION

This invention is directed to a process of preparing surfactant-polycrystalline inorganic nanostructured materials having designed microscopic patterns. The synthesis of silica-based mesostructured materials by using supramoleclar assemblies of surfactant molecules to template the condensation of inorganic species is a biomimetic approach to the fabrication of organic/inorganic nanocomposites. This technique holds great promise as a synthetic scheme to produce nanostructured materials with novel properties. For any of these applications to be realized, however, what is required is a method by which these nanostructures can be formed into controlled shapes and patterns rather than the microscopic particulates that have been previously reported.

Figure 9:
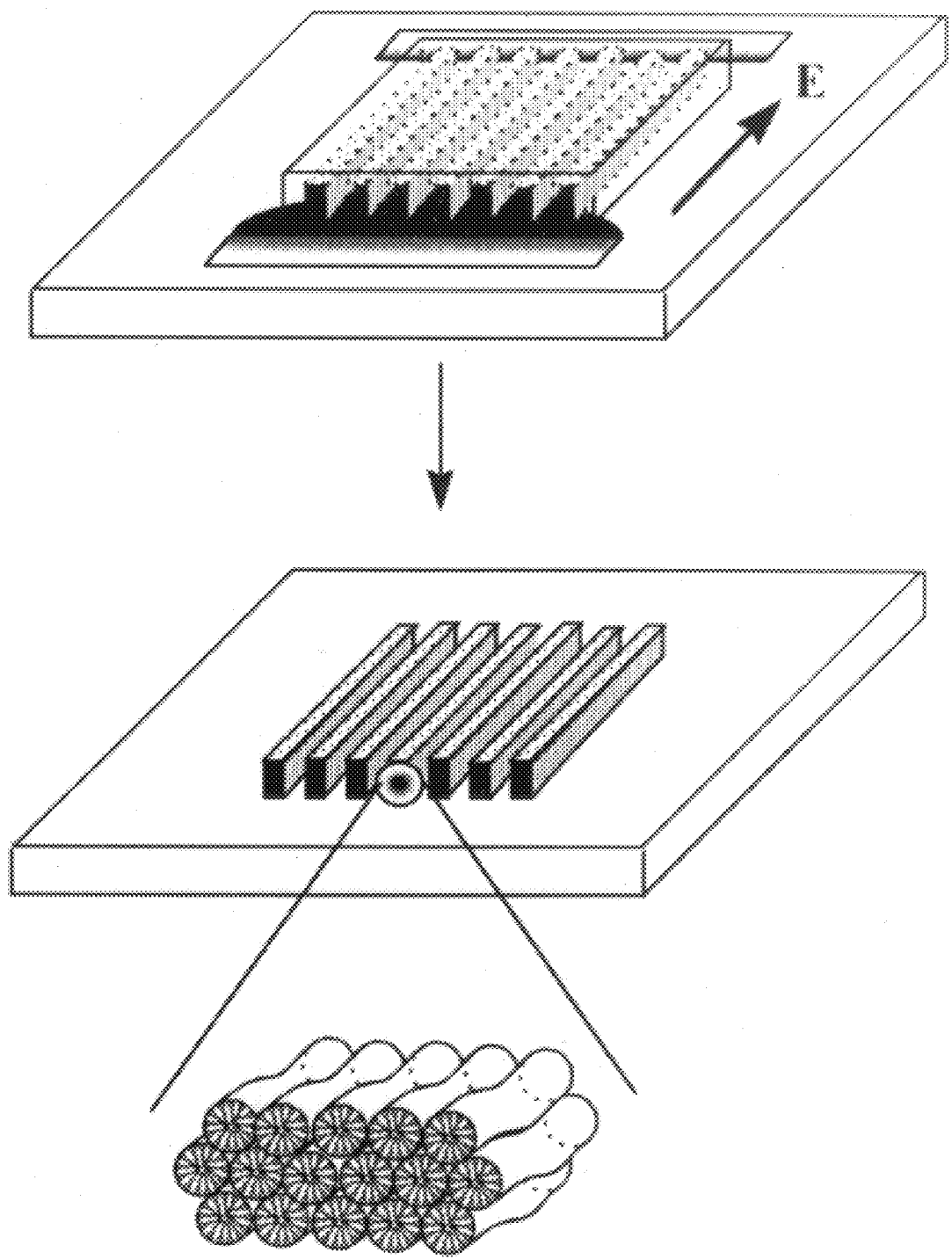
FIG. 9 is a schematic illustration of the process of this invention used to induce guided growth of mesoscopic silicate structures.

The process of this invention includes forming a polycrystalline inorganic substrate having a flat surface and placing in contact with the flat surface of the substrate a surface having a predetermined microscopic pattern. A network of patterned capillaries is formed by placing an elastomeric stamp (typically made of polydimethyl siloxane, PDMS) possessing designed relief features on its surface in contact with a flat substrate (see FIG. 9).

Preferably, an ordered silicate structure is used within a highly confined space, using the Micromolding in Capillaries (MIMIC) technique. Other polycrystalline inorganic substrates may also be used and include a wide variety of transition metal oxides, cadmium sulfide and selenide semiconductors.

A preferred approach is to start with a well-defined interface such as mica. Under acidic conditions, reactive SiOH anchoring sites on mica provide binding sites for the silica-surfactant micellar precursor species and orient a hexagonal phase of mesostructured silica as a continuous thin film. It has been found that this approach is not just limited to the hydrophilic surface of mica but can be generalized to form continuous mesostructured silicate films onto a wide variety of substrates, including hydrophobic surfaces such as graphite. Of primary concern is the structure of the first layer of adsorbed surfactant at each of these interfaces. Although the molecular organization and self-assembly of surfactants at interfaces is a widely studied area, little is still known about the precise structure of adsorbed surfactant layers.

An acidified aqueous reacting solution is then placed in contact with an edge of the surface having the predetermined microscopic pattern. The solution wicks into the microscopic pattern by capillary action. The reacting solution has an effective amount of a silica source and an effective amount of a surfactant to produce a mesoscopic silica film upon contact of the reacting solution with the flat surface of the polycrystalline inorganic substrate and absorption of the surfactant into the surface.

It is important for the biomimetic processing of thin inorganic films to maintain relatively low levels of supersaturation during the precipitation process in order to minimize the amount of particle formation in bulk solution.

All mineralization processes involve the precipitation of inorganic material from solution. A key requirement for successful film formation is to promote the formation of the inorganic phase on the substrate directly (that is, heterogeneous nucleation) and prevent the homogeneous nucleation of particles in the solution. According to classical nucleation theory, the free energy change ($\Delta F$) associated with the precipitation of an inorganic cluster from solution onto a surface is given by:

$$\Delta F = -nk_B T \ln S + \gamma_{il} A_{il} + (\gamma_{is} - \gamma_{sl}) A_{is} \tag{1}$$

where S represents the degree of supersaturation in the fluid; n is the aggregation number; $k_B$ is Boltzmann's constant; T is temperature; $\gamma_{il}$, $\gamma_{is}$, and $\gamma_{sl}$ represent the inorganic/liquid interfacial tension, respectively; and $A_{il}$ and $A_{is}$ represent the corresponding interfacial areas.

When the interaction between the growing nucleus and substrate surface represents a lower net interfacial energy than the inorganic/solution interfacial energy i.e., $(\gamma_{is}-\gamma_{sl}) A_{is} < \gamma_{il} A_{il}$, heterogeneous nucleation is favored over homogeneous nucleation. This is the case for the majority of precipitating inorganic systems, and hence heterogeneous nucleation is the dominant precipitation mechanism for thermodynamically controlled systems. Homogeneous nucleation will only dominate at relatively high levels of supersaturation where the precipitation process becomes kinetically controlled. Precipitation times for homogeneous nucleation vary enormously, from months to milliseconds, depending sensitively on the value of S.

More specifically, in order to promote growth of a mesostructured inorganic on these substrates, an aqueous recipe that includes an excess of adsorbing cetyltrimethyl ammonium chloride (CTAC) surfactant and a dilute acidic solution of tetraethoxy silane (TEOS) inorganic precursor is used. Inorganic solute concentrations are purposefully kept dilute in order to decrease the rate of homogeneous nucleation to such an extent that the more thermodynamically favored heterogeneous nucleation route is dominant. The procedure involved dissolving TEOS liquid in an aqueous solution of CTAC and hydrochloric acid. Typical molar ratios are 1 TEOS:2 CTAC:9.2 HCl:1000 $H_2O$.

The formation of a mesoscopic silica film begins to occur immediately upon contact of this solution with any interface onto which the surfactant can adsorb. A dilute solution of the TEOS silica source is specifically used to prevent homogeneous nucleation of inorganic material in bulk solution, and to promote heterogeneous nucleation and growth of a mesoscopic film at the substrate/solution interface.

Aksay et al., *Science* 273, 892 (1996), the entire disclosure of which is incorporated herein by reference, describes the production of mesoscopic films without the required electric field of this invention. FIGS. 1–7 are taken from this reference for background and comparison.

FIG. 2 shows SEM images of mesoscopic films grown for a period of 24 hours at the mica, graphite, and silica/water interfaces. Under similar conditions, freestanding mesostructured silica films can also be grown at the air/water interfaces. All of the films are continuous and display distinctly different textures at length scales between 0.5 and 10 µm.

FIG. 3 shows in situ AFM images of the atomic lattice of each substrate as well as the structure of the mesoscopic silica overlayer growing on each surface. To obtain these images, a method was used that uses electrical double layer repulsive forces to image the charge distribution of an adsorbed layer on the sample. The images of the outer layer of the reacting mesostructured film were obtained by immersing the imaging tip and substrate in the reacting mixture and, once sufficient time was allowed for thermal and mechanical equilibration, setting the image setpoint in the repulsive precontact region. In this way, the tip is held ~1 nm above the reacting surface and the scanning motion of the AFM produces a topological map of charge density.

Figure 3A:
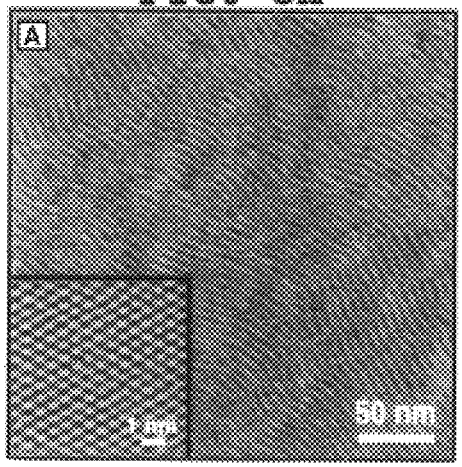
FIGS. 3(A)–(C) show in situ AFM images of mesostructured films growing on mica, graphite, and amorphous silica substrates, respectively. AFM images of the mica, graphite, and silica substrates used to grow mesoscopic silica films are shown in the insets. (A) and (B) illustrate the periodic mica and graphite atomic lattices, respectively, onto which CTAC adsorbs and orients; (C) reveals a smooth, amorphous silica substrate. Images of the films were obtained in "noncontact" mode, utilizing the electrical double layer force. (A) Meandering surfactant tubules on the mica substrate, 6.2 to 6.8 nm spacing, oriented parallel to the solid/liquid interface. Tubules are initially aligned along one of the three next-nearest-neighbor directions of the mica oxygen lattice displayed in inset. In the early stages of the reaction (<7 hours), this orientation is preserved as tubules continue to assemble and grow away from the interface coupled with silica polymerization. (B) On graphite, tubules align parallel to the substrate along one of three symmetry axes of the hexagonal carbon lattice shown in the inset. Unlike the structures on mica, these do not meander but form rigid parallel stripes. (C) On amorphous silica, periodic dimples are observed rather than stripes, suggesting an orientation of the tubules away from the interface.
Figure 3B:
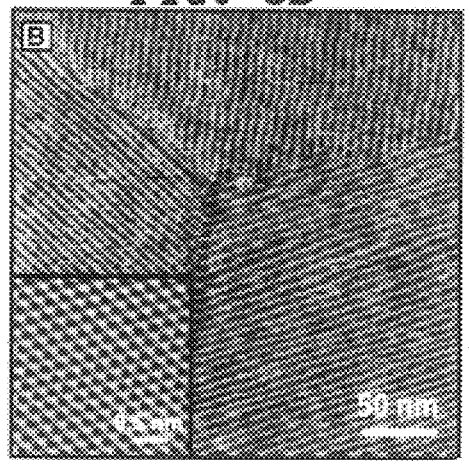

In the case of mica, FIG. 3A reveals meandering stripes with a spacing of 6.2 to 6.8 nm. These are observed at every stage of the reaction. After 10 hours of reaction, in situ AFM images are difficult to obtain because of the appreciable growth of mesostructured silica on the top surface of the AFM flow cell and cantilever spring. The presence and irregular nature of both of these films disturb the reflection of the laser light beam used to monitor spring deflection. As discussed below, x-ray diffraction (XRD) analysis of these films reveals a distorted hexagonal stacking of surfactant tubules (5.6 nm nearest-neighbor spacing) that lie parallel to the surface and are axially aligned along the next-nearest-neighbor direction of the hexagonal oxygen lattice on the mica surface.

Figure 4A:
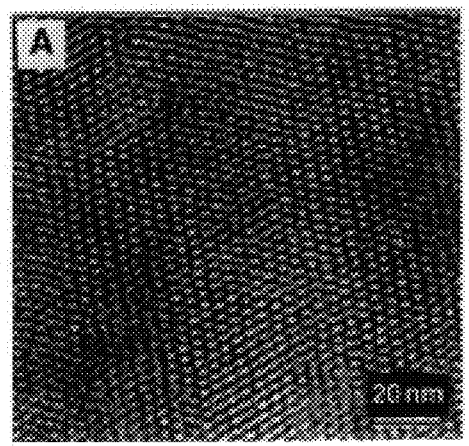
FIGS. 4(A)–(B) show TEM images of a mesostructured silica film grown on mica. Both images are in a transverse orientation with respect to the film and reveal hexagonal packing of tubules aligned parallel to the substrate. The image in (A) reveals a slight elliptical distortion of the tubules suggesting that the films are strained, that is, compressed in the direction normal to the template.
Figure 4B:
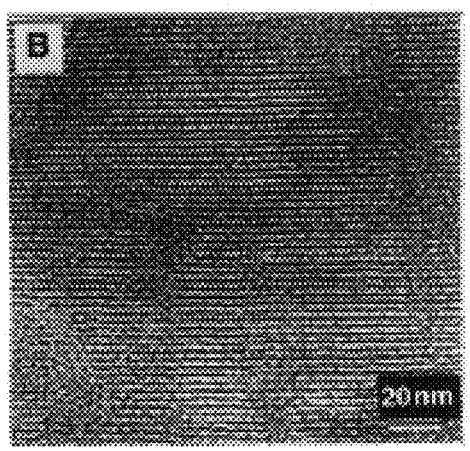

FIG. 4 shows TEM images of a mesostructured film on mica, cut in two different transverse directions. All three methods reveal a consistent structure of the mesostructured film on mica. AFM images similar to those in FIG. 3A were obtained without TEOS present, but these interfacial surfactant films are limited to one or two layers of cylindrical tubules. AFM studies on systems containing only surfactant, with no TEOS, reveal the presence of several layers of adsorbed surfactant tubules. Three-dimensional "multilayer" features have been imaged with the microscope, and as many as three "steplike" features are observed in the repulsive portion of the force-distance curve near the substrate (M. Trau et al., in preparation). The existence of such supramolecular surfactant structures in the absence of TEOS suggests a sequential reaction mechanism involving surfactant self-assembly followed by inorganic condensation.

Figure 5A:
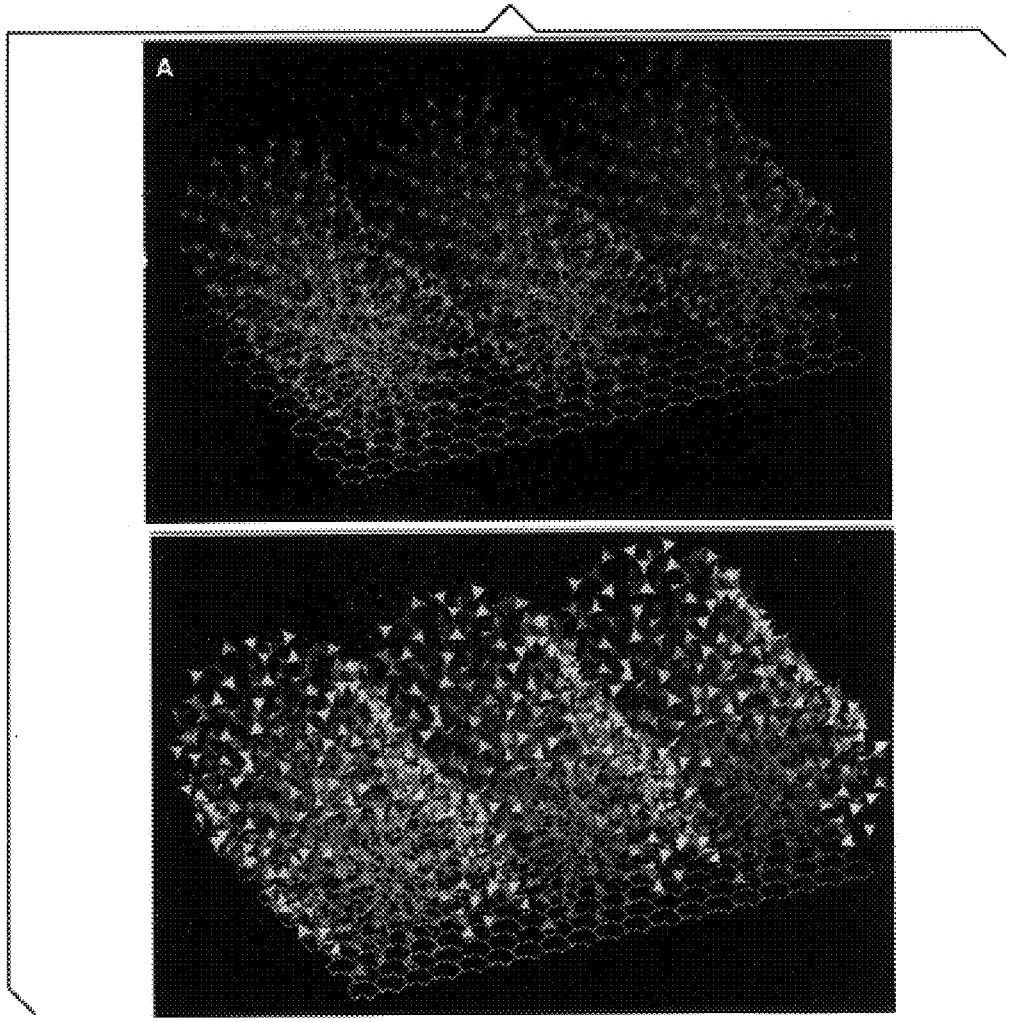
FIG. 5(A) is a schematic illustration of the sequential mechanism of templated, supramolecular surfactant self-assembly on the mica surface (left), followed by intercalation and polymerization of inorganic monomer to form a mesostructured composite (right). Assembly of the first surfactant layer forms a template that defines the structure of the subsequent film. On mica, electrostatic interactions between the substrate and surfactant lead to complete cylinders that meander across the surface with a loose registry to the underlying substrate lattice.
Figure 5B:
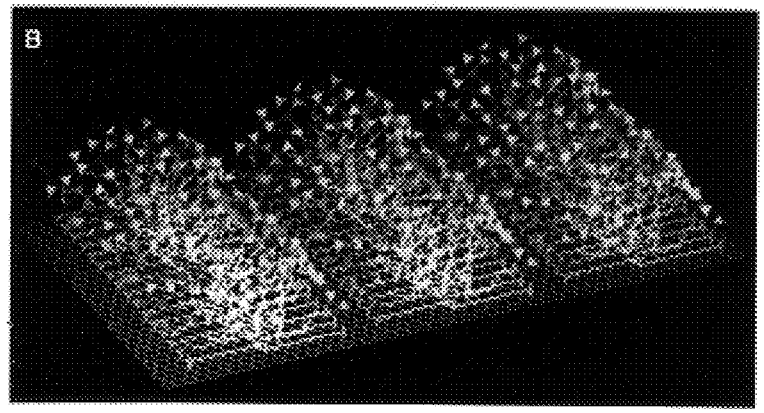
FIG. 5(B) is a schematic of a mesostructured silica on graphite. The rigid half-cylinder geometry on graphite occurs because attractive (hydrophobic and van der Waals) interactions between the graphite surface and the surfactant tails cause them to adsorb horizontally.

The self-assembly of micellar layers without the presence of the inorganic agent suggests a sequential growth and polymerization for the silicate films (FIG. 5A). First, the surfactant self-assembles on the mica substrate to form meandering tubules, and second, silicon hydroxide monomers (or multimers) polymerize at the micellar surface. As polymerization continues, more surfactant is adsorbed to the freshly formed inorganic surface and allows the templated mesoscopic structure to replicate itself and grow in to the bulk solution. After growth periods of 24 hours, the mesoscopic composite films begin to develop larger scale structural features such as those shown in FIG. 2A. At this stage, aligned "tapes" and steps appear with macroscopic grain boundary angles 60° and 120°. These macroscopic angles clearly result from atomic level registry of the surfactant tubules with the underlying mica lattice.

For graphite substrates (FIGS. 2B and 3B), the surfactant tubules are also aligned parallel to the surface, but in this case they are rigid, parallel stripes without the meandering curvature observed on mica. Measured nearest-neighbor spacings similar to that seen on mica and microscopic grain boundaries can be clearly imaged, which again suggests a preferential axial orientation of the surfactant tubules with the hexagonal graphite lattice. The graphite surface is distinct from mica in that it is hydrophobic and does not contain ionizable moieties to engender surface charge. Attractive interactions (hydrophobic and van der Waals) between the graphite surface and surfactant tails cause them to adsorb horizontally (FIG. 5B), and the resulting large interaction area per molecule gives rise to a strong orientation effect between molecule and substrate that is preserved in the cylindrical aggregates. Mica interacts only with the head group and orients the adsorbed molecules vertically; the smaller interaction area gives rise to a correspondingly smaller orientation effect. At long reaction times, macroscopic features grow out of the oriented, uniform film similar with macroscopic angles of 60° and 120° are also observed.

Figure 3C:
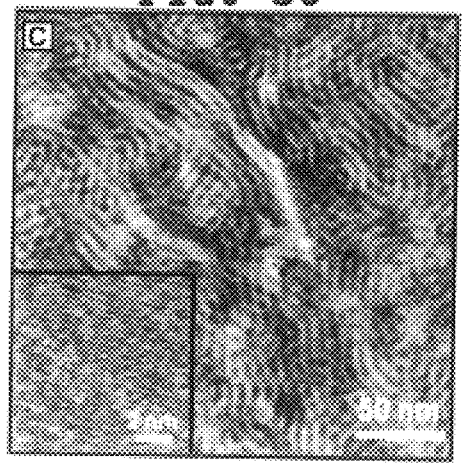

Growth of these films at the silica/water interface gives rise to silica films with macro and microstructures dramatically different from the ones described above. FIG. 3C shows an in situ AFM image of the reacting film grown from a silica substrate. Rather than the parallel stripes observed on the previous substrates, this image shows periodic arrays of dimples suggesting an orientation of surfactant tubules out of the plane of the interface. An XRD analysis confirms a distorted hexagonal packing of the tubules. The dimpled pattern suggests a twisting arrangement of hexagonally packed tubules attached to the interface at one end and spiraling into the solution. Similar dimpled structures were also observed with neat CTAC solution, which suggests the formation of roughly spherical surfactant aggregates that act as starting points on the surface for growth of cylindrical tubules into the solution. Micellar structures of quaternary ammonium surfactants on silica have been previously postulated and observed.

As in the case of mica and graphite, the structure formed in the silica substrate films is a direct consequence of the arrangement of the first layer of adsorbed surfactant on the surface. It appears that the ordering ability of the silica interface, which is dramatically different from that of mica and graphite, is not great enough to confine the surfactant tubules to lie straight on planar surfaces. Indeed, having nucleated one end of the tubules at the interface, the long axes of the tubules appear to wander over a wide range of slowly curving configurations in three dimensions, suggesting that it takes very little energy to bend the tubules along their long axes. This effect may simply be understood in terms of a Helfrich (W. Z. Helfrich, *Natur for Chung* 28C, 693 (1973)) bending energy model of the tubule surfactant layer:

$$E = \frac{k_c}{2}\left(\frac{1}{R_1} + \frac{1}{R_2} - \frac{1}{R_0}\right)^2 + \frac{k_g}{R_1 R_2} \quad (2)$$

where E is the free energy per unit area (effectively, an energy per surfactant molecule); $k_c$ and $k_g$ are the rigidity and Gaussian curvature constants, respectively; and $R_1$, $R_2$, and $R_0$ are the principle radii and the spontaneous radius of curvature, respectively. Although this form was derived for the thin-film limit in which the radii are large compared to the thickness of the surfactant layer, it also appears to describe reasonably well certain cases in which the surfactant layer thickness is comparable to $R_1$ and $R_0$. $R_1$, the small radius of the tubule, is strongly constrained by the length of the surfactant molecules. Insofar as $R_0$ is fixed by the surfactant composition and is small (~5 nm), as is typically the case for single-chain surfactants, and if $R_2 >> R_1$ as is the case for long, thin tubules, then Eq. 2 is well approximated by:

$$E = k_c/2\left(1/R_1 - \frac{1}{R_0}\right)^2 \qquad (3)$$

Figure 1A:
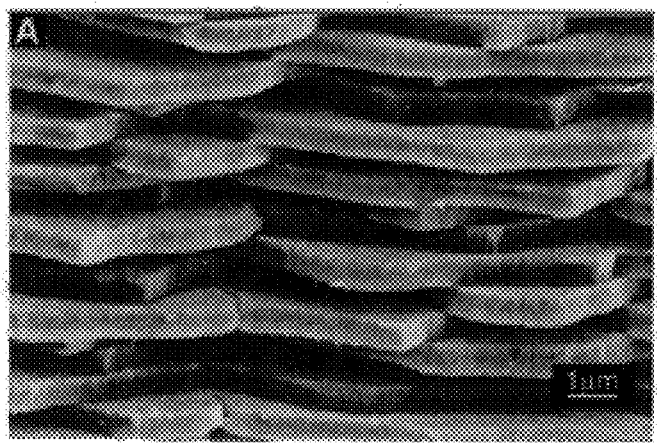
FIG. 1(A) A scanning electron microscopy (SEM) (Phillips XL30FEG) image of fracture surface of aragonitic portion of abalone nacre showing aragonite ($CaCO_3$) platelets of ~0.5 $\mu$m thick.
Figure 1B:
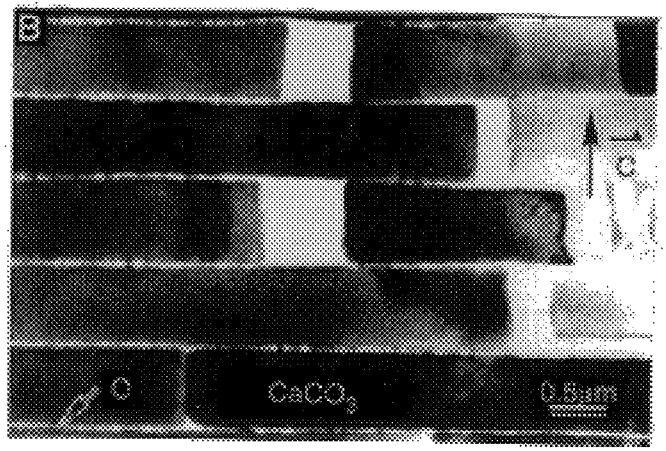
FIG. 1(B) A (TEM) Transmission electron microscopy Phillips CM200) image of the nacre cross section revealing a <10 nm thin organic film (marked "O") between the aragonite platelets with their c-axis normal to the organic template.
Figure 2A:
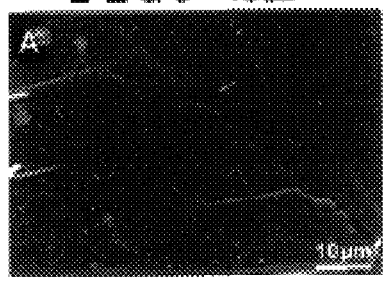
FIGS. 2(A)–(C) show SEM images of mesoscopic silica films grown at (A) mica/water, (B) graphite/water, and (C) silica/water interface for 24 hours, respectively. Oriented tapes are observed on mica and graphite. The films grown at the silica/water interface are uniform initially (dark background) but spiral-like structures (light features) form later.
Figure 2B:
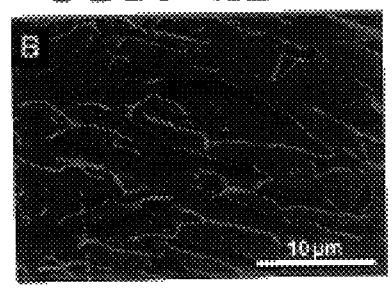
Figure 2C:
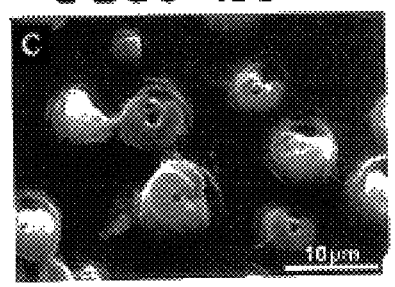
Figure 6A:
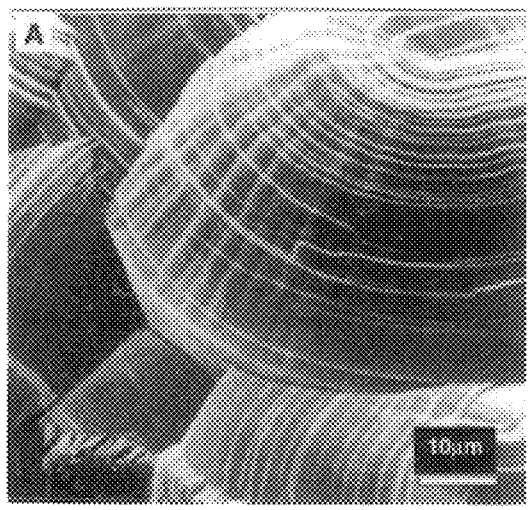
FIG. 6(A) shows a SEM image of a hierarchically structured mesoscopic silica film grown on a silica substrate. Although all of the films appear uniform at early stages of the reaction, once film thicknesses exceed ~0.5 $\mu$m, the ordering influence of the substrate becomes no longer important. Release of accumulated stain energy within the film leads to hierarchical structures, with tubule bundles wrapping around each other in three dimensions on several length scales.
Figure 6B:
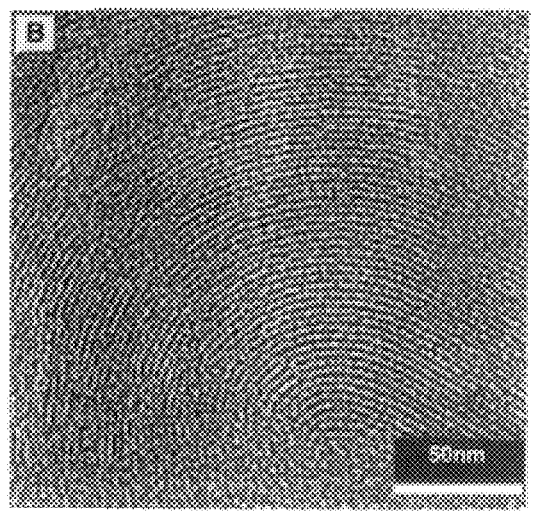
FIG. 6(B) shows a TEM image of a planar cross section of a film grown on silica. The cross section was taken through a macroscopic swirl in the film shown in (A) and reveals a spiraling and twisting arrangement of surfactant tubules.

In other words, the energy of bending along the long axis of a tubule does not figure prominently into the bending energy. Unless order is imposed on the tubules by external forces, such as adsorption forces, the tubules will sample a wide range of slowly varying configurations. This prediction is also consistent with observed macroscopic structures of mesoscopic silica films formed after long growth times at the silica/water interface (FIG. 6). These films begin growing as very uniform structures but soon become increasingly textured and chaotic as the film thickness increases. Rather than the oriented tapes observed in the cases of mica and graphite substrates, the silica substrate films display chaotic, spiral-like structures wrapped in a hierarchical fashion around each other (FIGS. 2C, 3C, and 6). The films become increasingly disordered once the thickness is great enough such that the surface can no longer induce ordering.

Figure 7:
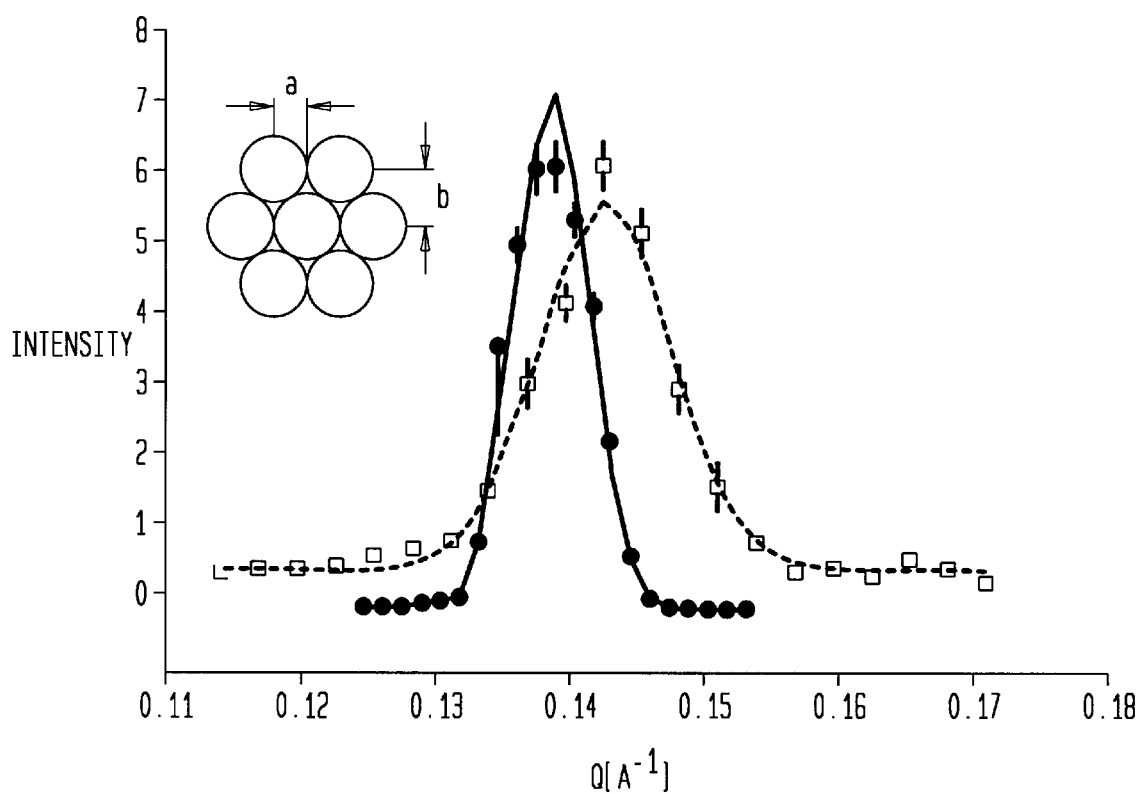

Aksay et al., investigated the substrate ordering effect on surfactant tubules and subsequent mesoscopic silica films, by performing XRD analyses of films grown on mica. In these measurements, the growth was terminated by partially draining the solution in a sealed cell and performing the measurements while the sample was in contact with the vapor of the growth solution. FIG. 7 indicates that the films are strained in the plane perpendicular to the substrate, with the hexagonal packing of tubules distorted by as much as 4% during growth. Upon drying, strain within the film is significantly altered. It was observed by Aksay et al., that there was +18% strain in the film grown in the nonequilibrium condition, in the case where the solution is confined in a thin film geometry by a wrap. It was also found that the film grows about an order of magnitude faster in this condition. There was a large change in the Bragg peak position as these films dry that corresponds to large changes in the film lattice constant and strain. For example, the degree of hexagonal strain varies from +18% while wet to +2% a few hours after removal from solution, and finally −7% several days later when they are dry. In this process, the lateral spacings of the film increased by 2% upon drying and finally by 5% after a few days. This implies that the 25% change in a/b ratio of the film upon drying was largely due to a change in the vertical lattice spacings due to drying shrinkage in the normal direction.

During growth, the strain appears to result from the ordering influence that the mica substrate exerts on the adsorbed surfactant tubules. That is, the forces that act to align the tubules parallel to the surface also act to deform the hexagonal packing in three dimensions. The forces responsible could be either van der Waals or electrostatic in nature because the mica surface has ionizable moieties. As the self-assembled organic layers grow away from the surface, the ordering effect is expected to diminish. Experiments performed in the absence of the TEOS inorganic precursor revealed that one or two layers of surfactant tubules can adsorb to the substrate prior to silica condensation. Once the TEOS is included in the solution, silica begins to condense within the adsorbed surfactant layers and films grow away from the surface. More layers of surfactant can now adsorb to the freshly formed silica interface, which provides a mechanism for the film to continue to grow out into the solution. This growth mechanism, however, does not relieve the original strain in the film. Moreover, as the film grows thicker, tubules adsorbed to the mesostructured silica will be stained differently to the initial layers adsorbed on the mica surface. Evidence for the eventual release of this strain is seen most clearly on the surface of films grown for long periods. An example is seen in FIG. 2A, where macroscopic features such as the "swirling tube" and "hook" appear and grow out of the aligned film in wormlike manner. On mica, these features begin to occur at film thicknesses of ~0.5 μm and always possess a wormlike structure. For films grown at the silica/water interface, dramatically different structures are seen to grow out of the film at similar film thicknesses (FIGS. 2C and 6). Although the first layer of tubule structure is different for each substrate, the release of accumulated strain within these films through the growth of tubule bundles away from the oriented film is a common feature of all of these films. For mica and graphite, these bundles form wormlike structures, and for silica, tapes and spirals are formed that wrap around each other in a hierarchical manner. The hierarchical structures formed in thick films thus appear to result from the release of accumulated strain energy associated with the epitaxial mismatch between the first layer of adsorbed surfactant and the periodic atomic lattice of the substrate. In all cases, this is observed to occur only for relatively thick films ($\geq 0.5$ μm) where the ordering influence of the substrate no longer exists.

The invention herein requires that after the acidified aqueous reacting solution be placed in contact with an edge of the surface having the predetermined microscopic pattern, and that an electric field be applied and directed tangentially to the surface within the microscopic pattern. The electric field should be sufficient to cause electro-osmotic fluid motion and enhance the rates of fossilization by localized Joule heating.

It has been found that within the capillaries, because the reacting solution is dilute, reactants are quickly depleted, and film growth ceases. Moreover, the growth of mesoscopic film at the edges of the mold seals the capillaries and prevents diffusion of reacting species to the interior of the mold. To maintain a uniform concentration of reactants within the capillaries during the growth process, the electric field is applied parallel to the substrate in the manner illustrated in FIG. 9.

Application of an electric field in this geometry has three effects: it induces electro-osmotic fluid flow; it aligns surfactant tubules; and it causes localized Joule heating of the solution. These effects are synergistic in guiding and fossilizing the silicate mesostructures within the microcapillary reaction chambers. For applied fields >0.1 kV nm$^{-1}$, electro-osmotic fluid flow is observed within the capillaries, as a result of the interaction of the field with the ionic double layer charge near the capillary wall. Surface charge on the capillary walls arises from adsorption of the positively charged CTAC surfactant. Maintaining a steady fluid flow through the capillaries during the entire growth process ensures that the reactant concentration within each micro reaction chamber remains constant with time—this constancy allows uniform films to be grown.

Figure 10A:
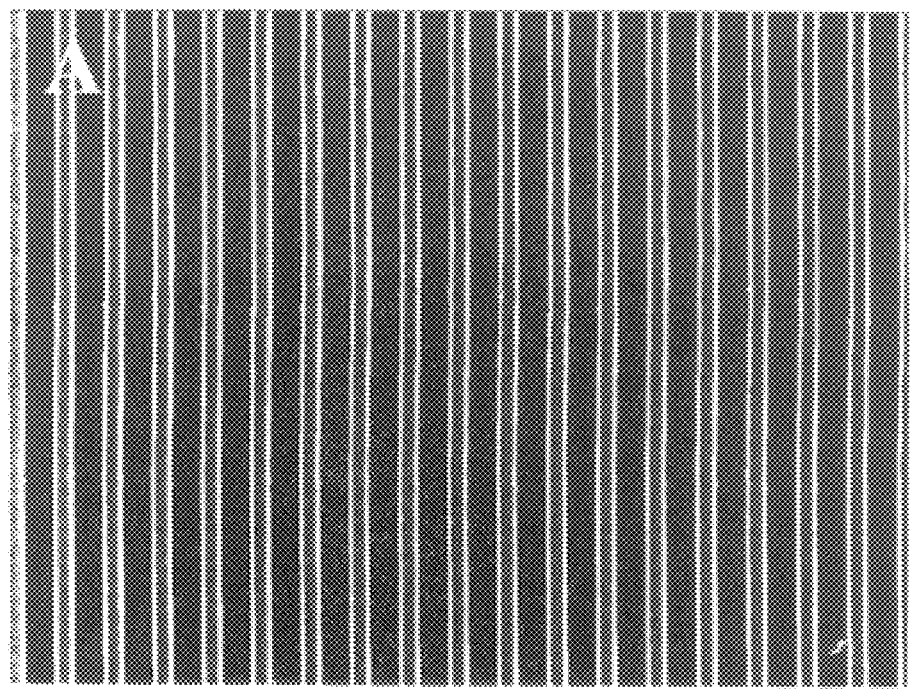
FIGS. 10(A) and (B) show SEM images of 1 $\mu$m line and square mesoscopic silicate patterns formed by guided growth within microcapillaries in accordance with this invention. Electro-osmotic flow is used to transport reacting fluid through the capillaries, and localized Joule heating triggers rapid polymerization of the inorganic around aligned surfactant tubules.
Figure 10B:
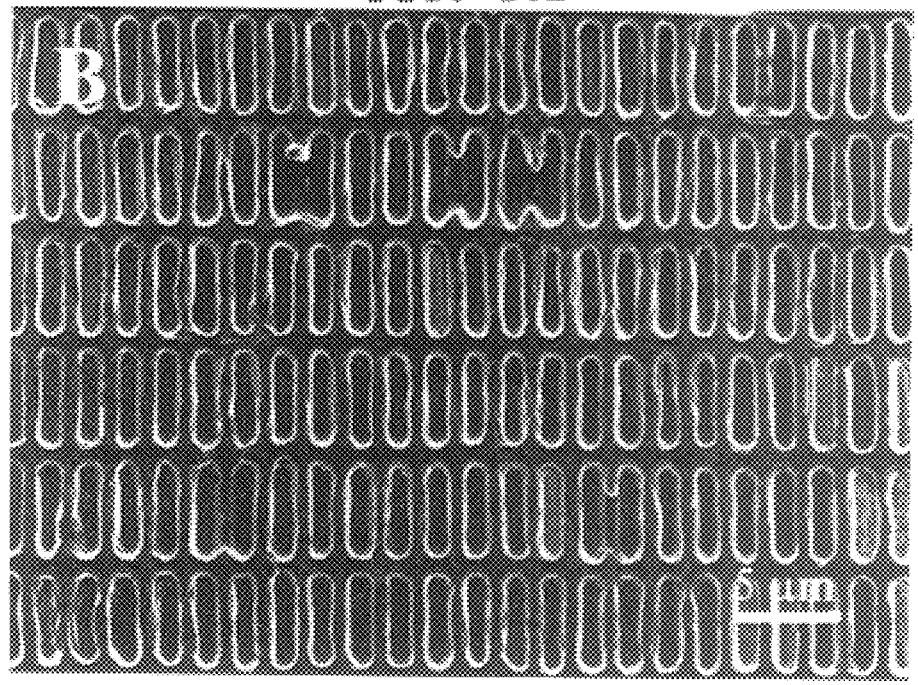

FIG. 10 shows SEM images of square and lined patterns of mesoscopic silica grown on a silica substrate after 5 hours of reaction time. A DC field of 0.15 kV mm$^{-1}$ was applied during the entire reaction process, and fresh reacting fluid was continuously dripped on one side of the mold to replenish the volume removed by the electro-osmotic flow. In each case, the patterns formed replicate the structures of the mold. Within the capillaries, films begin to grow on all exposed surfaces, i.e., at both the PDMS mold and the substrate/aqueous solution interface. As the reaction progressed, the capillaries narrowed in the center and eventually sealed completely.

The high conductivity of the acidic reaction solution gives rise to significant Joule heating at these applied voltages. Positioning the electrodes in an excess reservoir of reacting solution outside the microcapillary volume (FIG. 9) allows high fields to be applied across the aqueous solution confined within the capillaries. In such a scheme, rapid electrolysis ($H_2O \rightarrow H_{2+}\frac{1}{2}O_2$) ensues, however bubble formation is confined to the fluid reservoir near each electrode and does not disturb the formation of silica mesostructures within the capillaries. At voltages of 1 kV $mm^{-1}$, sparks are occasionally observed within the fluid confined in the microcapillary as a result of intense localized heating. At lower fields, sparks are not observed and the Joule heating accelerates the fossilization rate of the mesoscopic silica by increasing the rate of polymerization of TEOS precursor to silica.

With no applied field, 0.5 µm thick films are typically grown in a period of 24 h; with an applied field of 0.1 kV $mm^{-1}$, similar thicknesses are achieved in 1–5 h. Localized heating of the reacting solution in this manner provides a useful method of rapidly rigidifying the aligned surfactant tubular structures formed within the microcapillaries.

Figure 11:
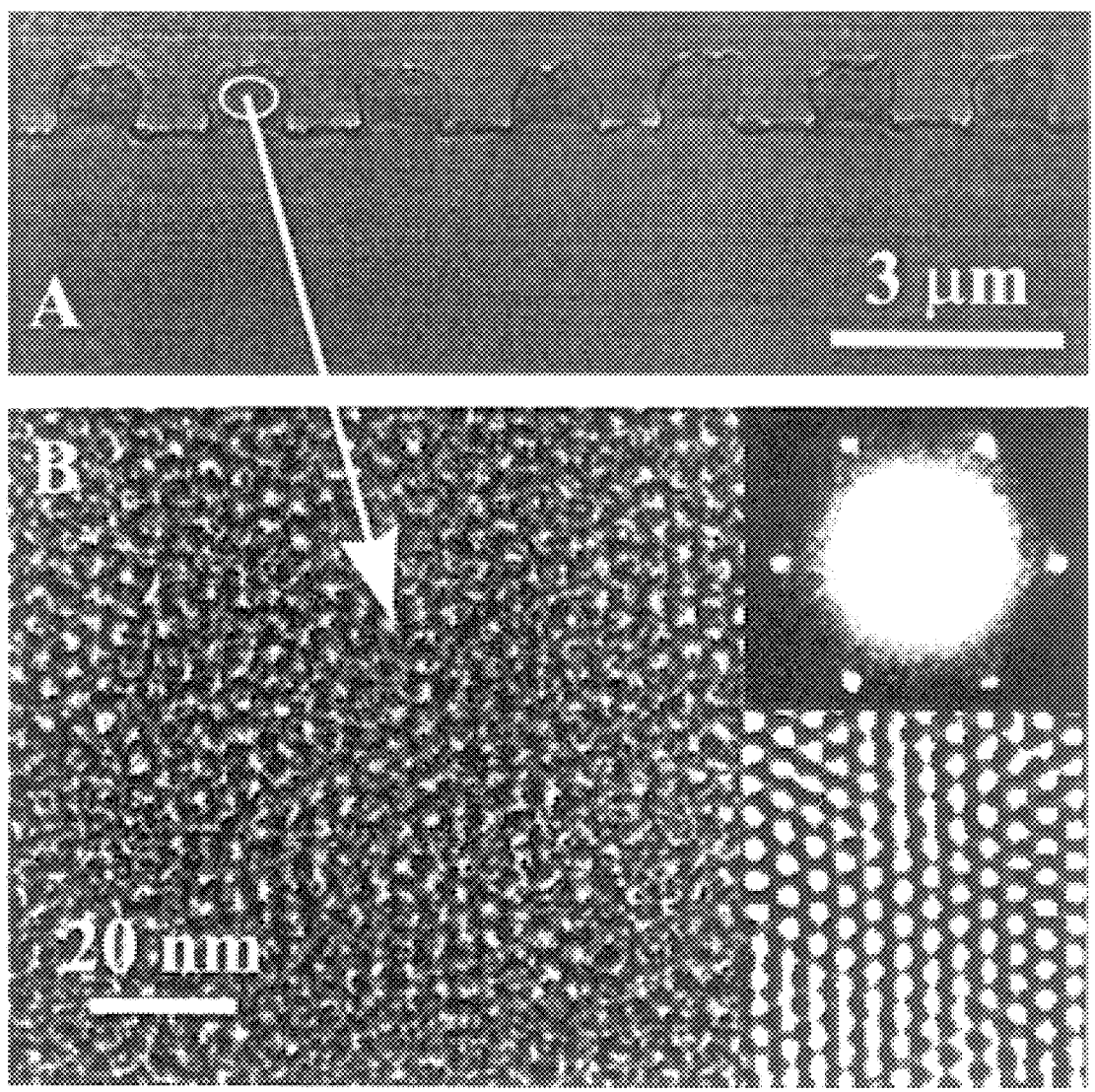
FIGS. 11(A) and (B) show TEM images of a patterned mesoscopic silica structure grown on a Thermanox plastic substrate (Electron Microscopy Sciences) in accordance with this invention. These display a hexagonally packed surfactant tubule structure within the micron-sized lines shown in FIG. 10. The cross-sectional view of each line reveals an identical hexagonally packed pattern of tubules, suggesting global alignment of tubules parallel to the substrate and capillary walls. Similar images have also been obtained for "confined" films grown on silica substrates. The insert in this FIG. 11 displays the corresponding electron diffraction.

In order to determine the orientation of the surfactant nanotubules within these structures, cross-sectional samples were prepared using a Leica ultramicrotome and analyzed by high resolution transmission electron microscopy (TEM). FIG. 11 shows a typical example of the resulting TEM images as well as a typical selected area electron diffraction pattern (SAED). These reveal a hexagonally packed arrangement of tubules with a nearest neighbor spacing of 3.0 nm. Detailed examination of diffraction pattern reveals a slightly distorted packing arrangement, with a deviation of 4% from perfect hexagonal. This distortion may be a result of the accelerated fossilization process described above: with no applied field, no distortion is observed.

Figure 8:
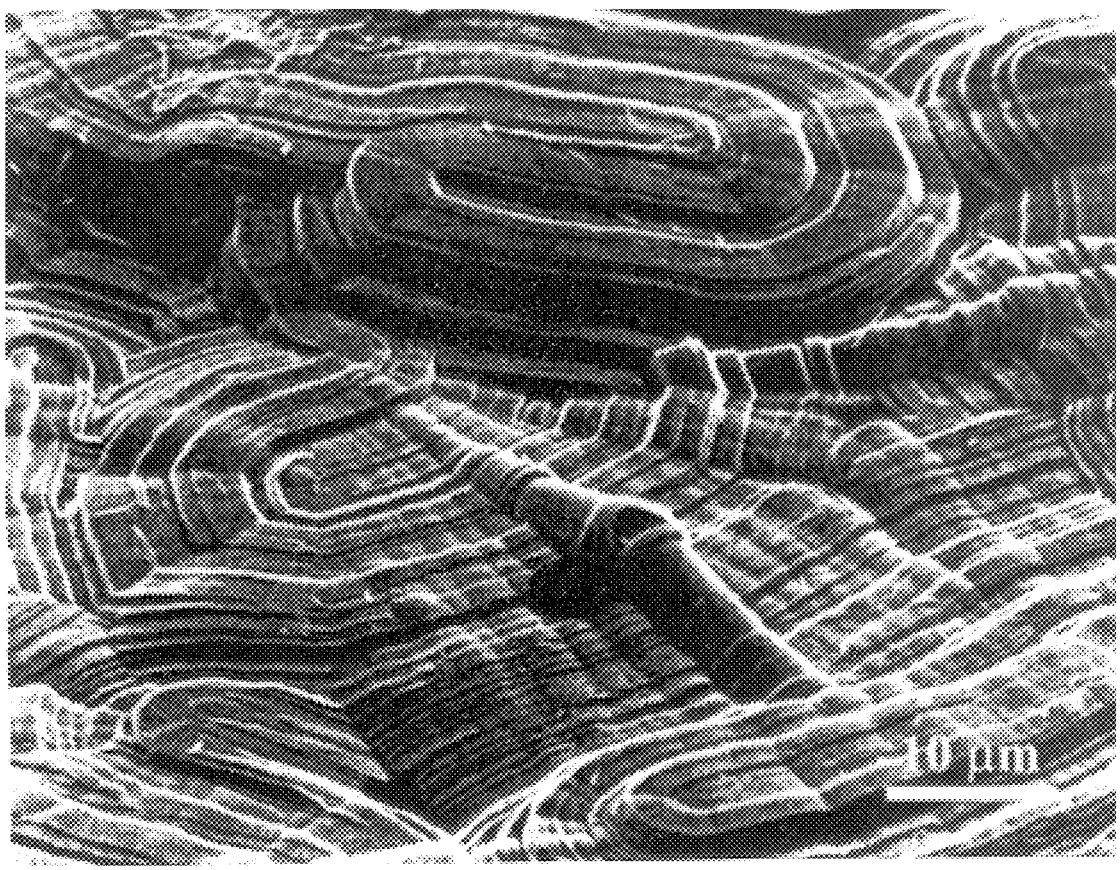
FIG. 8 shows a scanning electron microscope (SEM) image of an "unconfined" mesoscopic silica film grown on an amorphous silica substrate. Once the film becomes thicker than ~0.5 $\mu$m, a chaotic, hierarchical structure of winding tubules is formed.

Multiple cross-sections taken of the 1 µm line structures shown in FIG. 10 all appear identical to the image shown in FIG. 11. This indicates that all tubules within the capillaries are aligned parallel to the substrate, the long axis of the capillary, and the direction of the applied field. This results in a dramatic contrast to the "unconfined" mesoscopic silica film synthesis, which always results in a chaotic and non-aligned arrangement of tubules (FIG. 8). In the process of this invention, rather than taking on a random configuration, growing tubules are guided within the confined space of the capillary and remain parallel to the walls. This orientation occurs either as a result of the action of the external field, i.e., alignment of tubules resulting from polarization body forces that operate in regions of dielectric constant gradient ($\sim \nabla \epsilon E^2$) or by virtue of the confined space within which the reaction is performed. In both cases, the tubules would be aligned parallel to the capillary walls. For field-induced alignment, such configurations minimize the overall electrostatic energy—provided a difference in dielectric constant exists between the inner and outer volume of the tubule. It is also known that the formation of end-caps in self-assembled surfactant cylinders is not favored, given their high free energy of formation. Thus, within, a highly confined region, surfactant cylinders will take on configurations which minimize the number of end-caps. Consequently, they will tend to elongate along the long axis of the capillary rather than truncating at capillary walls.

In the absence of an ordering field, a wide range of slowly curving configurations of tubules if formed in three-dimensions (FIG. 8). As described previously, such a configuration can be understood in terms of a simplified Helfrich, W. Z., Naturforch. 28C, 693 (1973), bending energy model of the surfactant tubule, $E = K_c/2(1/R_1 - 1/R_0)^2$, where E is the free energy per unit area (effectively, an energy per surfactant molecule in the tubule), $k_c$ is a rigidity constant, and $R_1$ and $R_2$ are respectively the principal and spontaneous radius of curvature of the tubule. In so far as $R_0$ is fixed by the surfactant composition and is small (~5 nm), as is typically the case for single chain surfactants, the above equation shows complete insensitivity to $R_1$ for values $>> R_0$. This analysis implies that the energy of bending along the long axis of a tubule does not figure prominently in the bending energy. Thus, unless order is imposed on the tubules by external forces, such as adsorption forces, or an electric or flow field, the tubules will sample a wide range of slowly varying configurations. This concurs during "unconfined" film growth, where it was shown that orientation and alignment of tubules can be controlled in the initial stages of film growth by manipulating the strength and nature of the specific surfactant-substrate interactions. Although this growth scheme gives some control over the film structure, once the film grows away from the interface, the orientation that existed in the first layers begins to be lost as the ordering influence on the interface diminishes. In our case, the combined influence of confining geometry and applied field allows the synthesis of mesoscopic silicate nanostructures with precisely controlled geometries. In this way, the tubule geometry is controlled in all regions of the film and the synthesis can be performed on any required substrate, regardless of the nature of the surfactant-substrate interaction.

An enormous variety of patterns can be formed using the MIMIC approach, with nanotubules aligned parallel to capillary walls. Capillary thicknesses of 1 µm, corresponding to roughly 300 nanotubules, are easily achieved by this method and thinner structures can also be formed using molds formed from masters prepared by electron beam lithography.

As a viable method for the production of thin films with complex nanometer and micro-scaled hierarchical architecture, the guided growth of mesoscopic silicates within confined geometries provides a convenient method for fabrication of nanostructured materials in a variety of applications ranging from sensors and actuators to optoelectronic devices.

Having thus described the invention in detail, it is to be understood that the foregoing description is not intended to limit the spirit and scope thereof. What is desired to be protected by Letters Patent is set forth in the appended claims.

What is claimed is:

1. A process for preparing surfactant-polycrystalline inorganic nanostructured materials having designed microscopic patterns, comprising:

a) forming a polycrystalline inorganic substrate having a flat surface;

b) placing in contact with the flat surface of the substrate, a surface having a predetermined microscopic pattern;

c) placing in contact with an edge of the surface having the predetermined microscopic pattern, an acidified aqueous reacting solution, the solution wicking into the microscopic pattern by capillary action, wherein the reacting solution comprises an effective amount of a silica source and an effective amount of a surfactant to produce a mesoscopic silica film upon contact of the reacting solution with the flat surface of the polycrystalline inorganic substrate and absorption of the surfactant into the surface; and d) applying an electric field tangentially directed to the surface within the microscopic pattern, the electric field being sufficient to cause electro-osmotic fluid motion and enhanced rates of fossilization by localized Joule heating.

2. A process for preparing surfactant-silicate nanostructured materials having designed microscopic patterns, comprising:
   a) forming an ordered silicate structure substrate having a flat surface;
   b) placing in contact with the flat surface of the substrate a surface of a stamp, the stamp surface having relief features comprising a predetermined microscopic pattern;
   c) placing in contact with an edge of the stamp an acidified aqueous reacting solution, the solution wicking into the predetermined microscopic pattern by capillary action, wherein the reacting solution comprises an effective amount of a silica source and an effective amount of a surfactant to produce a mesoscopic silica film upon contact of the reacting solution with the flat surface of the ordered silicate structure substrate and absorption of the surfactant into the surface; and
   d) applying an electric field tangentially directed to the surface within the microscopic pattern, the electric field being sufficient to cause electro-osmotic fluid motion and enhanced rates of fossilization by localized Joule heating.

3. A process for preparing surfactant-silicate nanotubule structures having oriented patterning, comprising:
   a) forming an ordered silicate structure substrate having a flat surface;
   b) placing in contact with the flat surface of the substrate a surface of an elastomeric stamp, the elastomeric stamp surface having design relief features comprising a network of channels;
   c) placing in contact with an edge of the stamp an acidified aqueous reacting solution, the solution wicking into the network of channels by capillary action, wherein the reacting solution comprises an effective amount of a silica source and an effective amount of a surfactant to produce a mesoscopic silica film upon contact of the reacting solution with the flat surface of the ordered silicate structure substrate and absorption of the surfactant into the surface; and
   d) applying an electric field tangentially directed to the surface within the channels, the electric field being sufficient to cause electro-osmotic fluid motion and enhanced rates of fossilization by localized Joule heating.

4. A process for preparing surfactant-silicate nanotubule structures having oriented patterning, comprising:
   a) forming an ordered silicate structure substrate having a flat surface;
   b) placing in contact with the flat surface of the substrate a surface of an elastomeric stamp, the elastomeric stamp surface having design relief features comprising a network of channels;
   c) placing in contact with an edge of the stamp an acidified aqueous reacting solution the solution wicking into the network of channels by capillary action, wherein the reacting solution comprises an effective amount of tetraethoxysilane (TEOS) and an effective amount of a surfactant to produce a mesoscopic silica film upon contact of the reacting solution with the flat surface of the ordered silicate structure substrate and absorption of the surfactant into the surface; and
   d) applying an electric field tangentially directed to the surface within the network of channels, the electric field being sufficient to cause electro-osmotic fluid motion and enhanced rates of fossilization by localized Joule heating.

5. The process of claim 2, 3 or 4, further comprising removing the stamp after fossilization.

6. The process of claim 4, wherein the effective amount of tetraethoxysilane (TEOS) and the effective amount of the surfactant are sufficiently dilute to prevent homogeneous nucleation of tetraethoxysilane (TEOS) inorganic material in the solution prior to placing the solution in contact with the edge of the stamp.

7. The process of claim 2, 3 or 4, wherein the surfactant is cetyltrimethylammonium chloride (CTAC).

8. The process of claim 7, wherein the reacting solution has a molar ratio of about 1 TEOS:1.2 CTAC:9.2 HCl:1000 $H_2O$.

9. The process of claim 2, 3 or 4, wherein the ordered silicate structure is produced within a highly confined space using the Micromolding in Capillaries (MIMIC) technique.

10. The process of claim 3 or 4, wherein the elastomeric stamp comprises polydimethyl siloxane, (PDMS).

11. The process of claim 1, 2, 3 or 4, wherein the electric field is about $0.1–1\ kVmm^{-1}$.

* * * * *